US000001977H

(19) United States

(12) Statutory Invention Registration

Poorman

(10) Reg. No.: US H1977 H

(43) Published: Aug. 7, 2001

(54) CLOSED LOOP HYDRAULIC SYSTEM WITH VARIABLE CHARGE PRESSURE

(75) Inventor: Bryan G. Poorman, Princeton, IL (US)

(73) Assignee: Caterpillar Inc., Peoria, IL (US)

(21) Appl. No.: 09/220,233

(22) Filed: Dec. 23, 1998

(51) Int. Cl.[7] ..... F16D 31/00

(52) U.S. Cl. ..... 60/445

(56) References Cited

U.S. PATENT DOCUMENTS

| | | | |
|---|---|---|---|
| 4,087,969 | 5/1978 | Takahashi et al. | 60/464 |
| 4,754,603 | 7/1988 | Rosman | 60/415 |
| 4,838,024 | 6/1989 | Yamamoto et al. | 60/488 |
| 4,864,823 | 9/1989 | Ikejiri et al. | 60/488 |
| 5,048,294 | 9/1991 | Oshina et al. | 60/468 |
| 5,186,612 | 2/1993 | Budzich | 417/216 |
| 5,222,417 | 6/1993 | Sato | 74/861 |

*Primary Examiner*—Harold J. Tudor

(74) *Attorney, Agent, or Firm*—Kevin M. Kercher

(57) ABSTRACT

A closed loop hydraulic system having a variable charge pressure capability without parasitic power losses is disclosed. The present system includes a variable displacement hydraulic pump driven by a power source, a tilt control means for controlling a tilt angle of the variable displacement hydraulic pump, and a hydraulic motor having a pair of inlet/outlet ports connected in a closed circuit to a pair of inlet/outlet ports of the variable displacement hydraulic pump by way of a pair of main conduits. The system has a charging system including a charge pump driven by a power source, the charge pump including an inlet connected to a supply of oil, and an outlet port connected to the closed circuit for supplying pressurized oil to the variable displacement hydraulic pump. The charge system further includes an electrohydraulic proportional relief valve including means for varying an operating pressure setting thereof, which electrohydraulic proportional relief valve is connected to the charging system for controlling the pressure level of the pressurized oil supplied to the variable displacement hydraulic pump. The means for varying the operating pressure setting of the proportional relief valve are controlled by control means responsive to at least a pressure condition in the closed circuit. According to another aspect of the invention, the charging system is also connected to a hydraulic circuit of the tilt control means for supplying pressurized oil thereto.

8 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

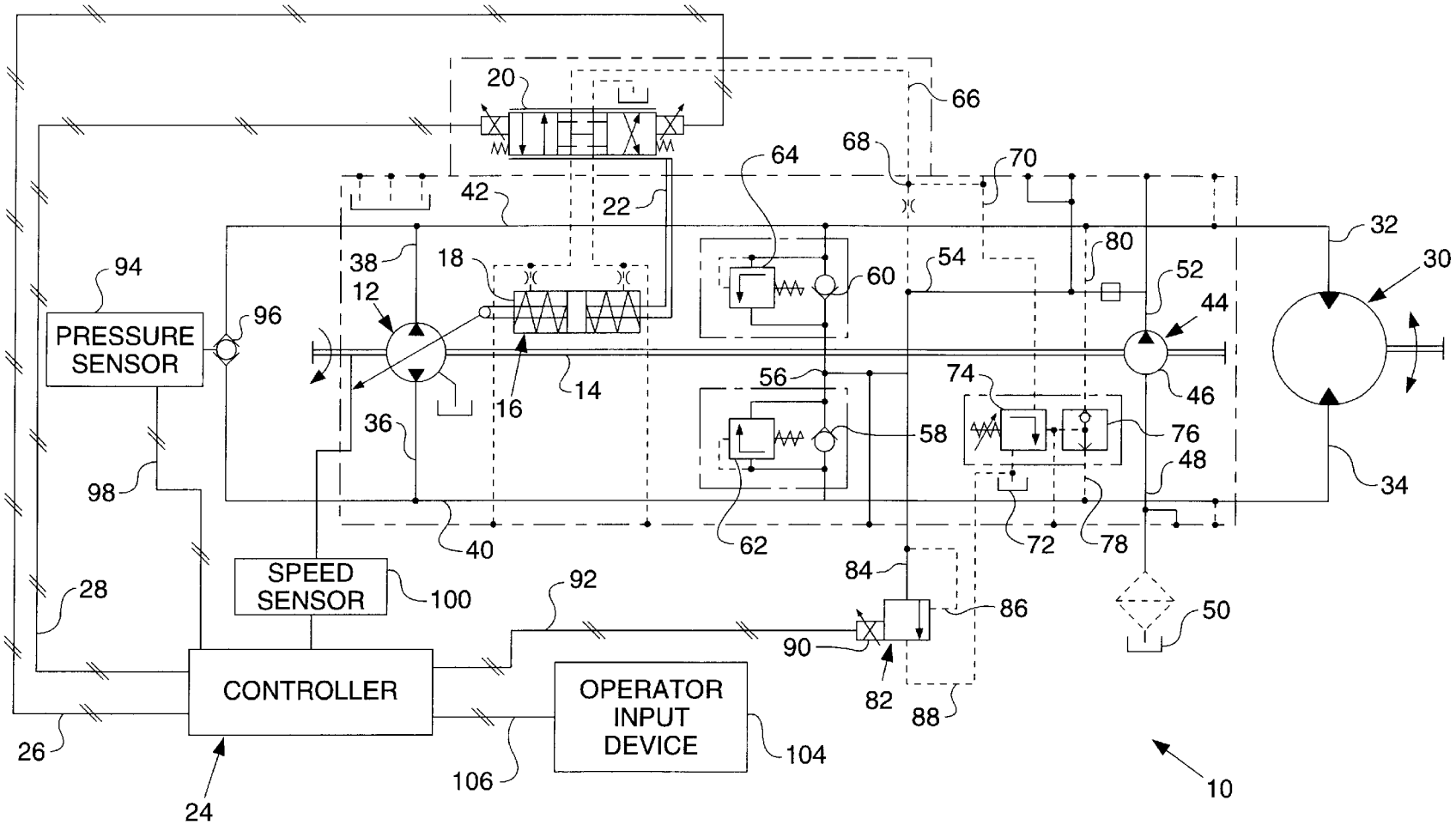
OPERATOR INPUT DEVICE
SPEED SENSOR
CONTROLLER
PRESSURE SENSOR

CLOSED LOOP HYDRAULIC SYSTEM WITH VARIABLE CHARGE PRESSURE

TECHNICAL FIELD

This invention relates generally to a closed loop hydraulic system including a charging system providing variable charge pressure, and more particularly, to a closed loop hydraulic system providing variable charge pressure relief through an electrohydraulic proportional relief valve and control means therefor responsive to at least a pressure condition in the closed circuit for providing charge flow sufficient to meet charge requirements without parasitic power losses.

BACKGROUND ART

Parasitic power losses are a concern with closed loop hydraulic systems, including, but not limited to, hydrostatic vehicle proportion drives and differential steering systems. It has been found that a major contributor to such parasitic losses in these systems is the wasted hydraulic power of the charge flow being throttled across a charge relief valve. Charge systems typically provide power proportional to engine power at a constant pressure for system oil makeup and control actuation. Under some operating conditions, the charge system flow is substantially greater than that required. For instance, at a null condition, that is, wherein the main pump is not providing flow, charge flow is only needed to provide makeup for leakage and/or flushing in the closed loop system. Thus, it has been observed that at conditions such as the null condition the charge system flow can be significantly reduced. However, it has previously been problematic to reduce charge flow in a closed loop system without incurring corresponding parasitic power losses.

Accordingly, the present invention is directed to achieving one or more of the objectives as set forth above.

DISCLOSURE OF THE INVENTION

According to one aspect of the present invention, a closed loop hydraulic system having variable charge pressure without parasitic power losses is disclosed. The present system includes a variable displacement hydraulic pump driven by a power source, a tilt control means for controlling a tilt angle of the variable displacement hydraulic pump, and a hydraulic motor having a pair of inlet/outlet ports connected in a closed circuit to a pair of inlet/outlet ports of the variable displacement hydraulic pump by way of a pair of main conduits. The system has a charging system including a charge pump driven by a power source, the charge pump including an inlet connected to a supply of oil, and an outlet port connected to the closed circuit for supplying pressurized oil to the variable displacement hydraulic pump. The charge system further includes an electrohydraulic proportional relief valve including means for varying an operating pressure setting thereof, which electrohydraulic proportional relief valve is connected to the charging system for controlling the pressure level of the pressurized oil supplied to the variable displacement hydraulic pump. The means for varying the operating pressure setting of the proportional relief valve are controlled by control means responsive to at least a pressure condition in the closed circuit and are operative to reduce the charging system pressure, without incurring parasitic power losses. According to another aspect of the invention, the charging system is also connected to a hydraulic circuit of the tilt control means for supplying pressurized oil thereto.

BRIEF DESCRIPTION OF THE DRAWINGS

The sole FIGURE is a schematic representation of a closed loop hydraulic system with variable charge pressure according to the present invention.

BEST MODE FOR CARRYING OUT THE INVENTION

Referring now to the drawing, a hydraulic system 10 is illustrated. Hydraulic system 10 is a closed loop system including a variable displacement hydraulic pump 12 conventionally connected in driven communication with a power source (not shown) by a drive shaft 14. Pump 12 is of conventional construction and operation and includes an internal tilt plate (not shown) operable for varying the displacement thereof, connected to tilt control means 16 including an actuator 18 operatively connected to a variably operable pump control valve 20 via lines 22. Pump control valve 20 is operator or system controllable using a controller 24 connected to valve 20 via wires 26 and 28. Controller 24 is preferably a computerized device including a microprocessor or similar processor conventionally operable for controlling a tilt angle of the tilt plate of variable displacement hydraulic pump 12, and also a charging system, as will be explained.

Hydraulic system 10 includes a hydraulic motor 30 having a pair of inlet/outlet ports 32 and 34 connected in a closed circuit to a pair of respective inlet/outlet ports 36 and 38 of pump 12 by a pair of main conduits 40 and 42.

Hydraulic system 10 includes a charging system 44 including a charge pump 46 connected in driven communication with drive shaft 14. Charge pump 46 includes an inlet port 48 connected to a supply of oil 50, and an outlet port 52 connected to a supply line 54. Supply line 54 splits at connection 56 so as to connect through a pair of check valves 58 and 60 to the respective main conduits 40 and 42, check valves 58 and 60 allowing flow of pressurized oil therethrough from supply line 54 to the respective conduits 40 and 42, but not in the opposite direction. Opposite direction flow is allowed past the respective check valves 58 and 60 by variable pressure relief valves 62 and 64 when predetermined pressure conditions exist in the respective conduits 40 and 42.

Supply line 54 is additionally connected to pump control valve 20 of tilt control means 16 by a line 66 for providing pressurized oil thereto as required, which line 66 connects at connection 68 to a line 70 connected to a drain 72 through a relief valve 74 operable in association with a check valve 76 connected across conduits 40 and 42 via lines 78 and 80.

Charging system 44 importantly includes an electrohydraulic proportional relief valve 82 having an inlet port 84 and a pilot signal port 86 connected to supply line 54, and an outlet port 88 connected to drain 72. Proportional relief valve 82 has an operating pressure setting which is determined by an actuator 90 operably connected to controller 22 by wire 92. Controller 24 is operable for controlling actuator 90 for varying the operating pressure setting of proportional relief valve 82 responsive to inputs, including, but not limited to, a pressure condition in one of the main conduits 40 or 42 corresponding to the discharge pressure of pump 12, the operating speed of pump 12, and/or operator inputs. A pressure sensor 94 is connected to main conduits 40 and 42 at a resolver 96 for sensing a higher pressure condition in the respective conduits 40 and 42 corresponding to the disclosure pressure of pump 12, pressure sensor 94 being operable to communicate a pressure signal to controller 24 via a wire 98. A speed sensor 100 is positioned for sensing a rotational speed of drive shaft 14 representative to the speed of pump 12, and generating a signal representative thereof, the signal being communicated to controller 24 via a wire 102. Additionally, operator input is provided to controller 24 via operator input device 104 connected to controller 24 via a wire 106.

In operation, controller 24 controls actuator 90 based on inputs from pressure sensor 94, speed sensor 100, operator input device 104, and any other suitable desired parameter, including, but not limited to, an actuator torque map, or the like. The charge pressure is preferably maintained at a variable level just above that which is adequate to meet system requirements, although it is also contemplated that as few as two pressure levels could be utilized, including a lower pressure setting for null conditions of pump 12, and a higher setting when pump 12 is pumping. In either instance, since charge pressure relief is provided through electrohydraulic proportional relief valve 82, parasitic power losses due to throttling using system pressure are avoided.

INDUSTRIAL APPLICABILITY

The closed loop hydraulic system with variable charge pressure according to the present invention has utility for a wide variety of closed loops systems, including, but not limited to, hydrostatic vehicle proportional drives and differential steer systems for reducing parasitic power losses in the systems.

Other aspects, objects and advantages of the present invention can be obtained from a study of the drawings, the disclosure and the appended claims.

What is claimed is:

1. A hydraulic system, comprising:

a variable displacement hydraulic pump driven by a power source, a tilt control means for controlling a tilt angle of the variable displacement hydraulic pump;

a hydraulic motor having a pair of inlet/outlet ports connected in a closed circuit to a pair of inlet/outlet ports of the variable displacement hydraulic pump by way of a pair of main conduits;

a charging system including a charge pump driven by a power source, the charge pump including an inlet port connected to a supply of oil, and an outlet port connected to the closed circuit for supplying pressurized oil to the variable displacement hydraulic pump;

an electrohydraulic proportional relief valve including means for varying an operating pressure setting thereof and being connected to the charging system for controlling the pressure level of the pressurized oil supplied to the variable displacement hydraulic pump; and control means for controlling the means for varying the operating pressure setting of the electrohydraulic proportional relief valve responsive to at least a pressure condition in the closed circuit.

2. The hydraulic system, as set forth in claim 1, wherein the operating pressure setting of the electrohydraulic proportional relief valve is variable between a high pressure setting and a low pressure setting.

3. The hydraulic system, as set forth in claim 2, wherein the control means are operable for controlling the means for varying the operating pressure setting of the electrohydraulic proportional relief valve to maintain the high pressure setting responsive to a high pressure condition in the closed circuit and a low pressure setting responsive to a pressure condition representative of a null condition of the variable displacement hydraulic pump.

4. The hydraulic system, as set forth in claim 1, wherein the tilt control means comprise a hydraulic circuit, and wherein the outlet port of the charge pump is connected to said hydraulic circuit for supplying pressurized oil to the hydraulic circuit.

5. The hydraulic system, as set forth in claim 1, wherein the control means are responsive to the pressure condition in the closed circuit and a speed characteristic of the variable displacement hydraulic pump.

6. The hydraulic system, as set forth in claim 1, wherein the control means comprise a microprocessor operatively connected to a pressure sensor for sensing the pressure condition in the closed circuit.

7. The hydraulic system, as set forth in claim 6, wherein the pressure condition is a pump discharge pressure.

8. The hydraulic system, as set forth in claim 7, wherein the control means for controlling the means for varying the operating pressure setting of the proportional relief valve are operable responsive to the pump discharge pressure, a tilt characteristic of said variable displacement hydraulic pump, a speed of the pump, and an operator input.

* * * * *